United States Patent [19]

Palovcik

[11] 4,298,155
[45] Nov. 3, 1981

[54] METHOD FOR MAKING AN AXLE SPINDLE
[75] Inventor: John Palovcik, Kenton, Ohio
[73] Assignee: Rockwell International Corporation, Pittsburgh, Pa.
[21] Appl. No.: 202,912
[22] Filed: Nov. 3, 1980

Related U.S. Application Data
[63] Continuation of Ser. No. 62,714, Aug. 1, 1979, abandoned.
[51] Int. Cl.³ .............................................. B23K 31/02
[52] U.S. Cl. .............................. 228/114; 219/137 R; 228/173 F
[58] Field of Search .............. 29/159.3, 149.5 R; 228/112, 173 F, 114; 219/137 R

[56] References Cited
U.S. PATENT DOCUMENTS

| | | | |
|---|---|---|---|
| 313,517 | 3/1885 | Peckham | 301/124 R |
| 1,693,045 | 11/1928 | Murray | 228/173 F X |
| 2,370,641 | 3/1945 | Dewey | 228/173 F X |
| 3,096,565 | 7/1963 | Cerness et al. | 29/149.5 R |
| 3,701,564 | 10/1972 | Puzik | 301/131 |
| 3,886,649 | 6/1975 | Simon | 228/112 |

Primary Examiner—Joseph H. McGlynn
Assistant Examiner—K. J. Ramsey

[57] ABSTRACT

A spindle for an axle is capable of supporting a vehicle wheel which is rotatably mounted thereon. The method for forming such a spindle includes providing a hollow tubular blank having a generally uniform external diameter and wall thickness and forming the blank to generally reduce its diameter to thereby provide a pair of axially separated wheel bearing mounting regions for supporting the vehicle wheel. A portion of the blank inwardly of the inner bearing region is provided a frusto-conical outer surface. A collar having an inner surface to match the taper of the frusto-conical surface is installed thereon for providing an axial stop for the adjacent bearing. Several alternative methods are provided for securing the collar thereon.

17 Claims, 6 Drawing Figures

METHOD FOR MAKING AN AXLE SPINDLE

This is a continuation of application Ser. No. 62,714, filed Aug. 1, 1979, now abandoned.

BACKGROUND OF THE INVENTION

1. Field of the Invention

This invention relates to a method for making a spindle for an axle and, more particularly, to a method of forming a tubular blank having a uniform cross section and thickness to provide the general contour of the spindle and then securing a collar thereon to act as a bearing stop.

2. Description of the Prior Art

There remains a continuing need for reliable, safe and lightweight axles and/or axle spindles for heavy duty trucks and trailers. An axle of this general type is disclosed in U.S. Pat. No. 3,037,818 to include at each spindle an outer first bearing and an inner second bearing for supporting the wheels. One area of concern when providing axles and axle spindles for these heavy duty vehicles is that adequate support and strength will be provided in the area of the wheel bearings. Consequently, for the inner wheel bearing, the spindle has generally been provided an integral, radially extending bearing stop and the spindle is generally thickened in this region to provide the desired strength. The bearing stop establishes the location of the wheel relative to the end of the spindle with a retaining nut being used to secure the wheel on the spindle as the inner bearing is forced against the bearing stop. While U.S. Pat. No. 3,037,818 discloses one method for forming such an axle and spindle, U.S. Pat. Nos. 3,465,418; 3,501,202; 3,535,002 and 3,564,896 present different methods for forming the axle but again include the two bearing mounting areas and a rigid, integrally formed bearing stop for the inner bearing.

While there has heretofore been disclosed a number of methods of forming an axle or an axle spindle from a generally tubular blank which might tend to save weight and material, there remains some question regarding the applicability of these methods for the particular heavy duty use for which the present invention is intended. For example, U.S. Pat. Nos. 1,091,751; 2,133,091 and 2,133,092 all disclose how a tubular blank having a uniform external diameter and a uniform thickness can be generally formed to provide the bearing mounting regions mentioned above for support of a vehicle wheel. However, since no provision is specifically made in these axle spindle configurations for providing a rigid bearing stop for the inner bearing, it is doubtful that such axle spindles could be utilized in the heavy duty environment expected for the present invention.

U.S. Pat. No. 3,701,564 appears to disclose that a spindle of the desired type can generally be formed by cold working a tubular blank to include a radially extending bearing stop while still maintaining a generally uniform wall thickness. However, there is some doubt that such a product could be satisfactorily employed. Generally, it has been found that the forces on an integrally formed bearing stop for the inner bearing are so significant that the resulting concentration of stresses at the transition between the bearing mounting region and the bearing stop have required the thickness of the spindle to be significantly enlarged in this area.

In fact, there have even been some axle spindles which have been formed from tubular blanks which initially were provided a non-uniform thickness to insure that additional metal would be retained in the bearing mounting region after the basic reduction in this area was completed.

It can be seen that a number of prior art axle spindles are inappropriate for use on heavy duty vehicles since no rigid bearing stop is provided. Other configurations appear to be appropriate for such use but require additional material and weight to provide adequate strength for such a bearing stop when it is integrally formed with the rest of the spindle. The use of any other type of a bearing stop on the spindle may have been considered inadequate for heavy duty use if, in fact, it was ever even considered as an alternative in the past. Although U.S. Pat. No. 313,517 appears to generally disclose that a separate collar may be installed as a bearing stop on an axle, this disclosure would not appear to be applicable for the expected heavy duty use. Rather than requiring two bearings of the present configuration, the disclosed tubular axle requires one large tapered bearing for wheel support. Even though the taper would significantly reduce the forces on the collar, it should be noted that this prior art configuration nevertheless includes a thickened basic spindle and is even provided additional material within the spindle for added strength in the collar region.

SUMMARY OF THE INVENTION

Therefore, it is an object of this invention to provide a method for making reliable, safe and lightweight axles and/or spindles for heavy duty trucks and trailers.

It is a further object to provide a method for taking a tubular blank of uniform cross section, forming it and adding an axle bearing stop surface to produce a lightweight axle for heavy duty trucks and trailers.

It is a still further object of this invention to provide a method for circumferentially cold forming a tubular blank having a uniform inner and outer diameter and to secure a bearing stop collar thereto to substantially reduce stress in the axle spindle as well as reducing the cost of manufacture.

To provide for these and other objects of the invention, a preferred method of forming a spindle for an axle capable of supporting a vehicle wheel rotatably mounted thereon includes providing a hollow tubular blank having a central axis, a generally uniform external diameter and wall thickness and a first open end. The tubular blank is then reduced at a first region thereof concentric with the central axis adjacent the first end to provide a first diameter thereof and a second region thereof concentric with the central axis remote from the first end to provide a second diameter which is greater than the first diameter and less than the external diameter. A first transition area formed between the first region and the second region and a second transition area having a generally frusto-conical outer surface is formed between the second region and a portion of the tubular blank which is free of the reducing the remote from the first end. A collar is provided having a minimum inner diameter greater than the second diameter for limited clearance therebetween and including a frusto-conical inner surface widening from the minimum inner diameter to match the taper of the second transition area. The collar has a radial surface at its inner diameter which is generally perpendicular to the axis of the collar. The collar is mounted on and secured to the second transition area.

DESCRIPTION OF THE INVENTION

Figure 1:
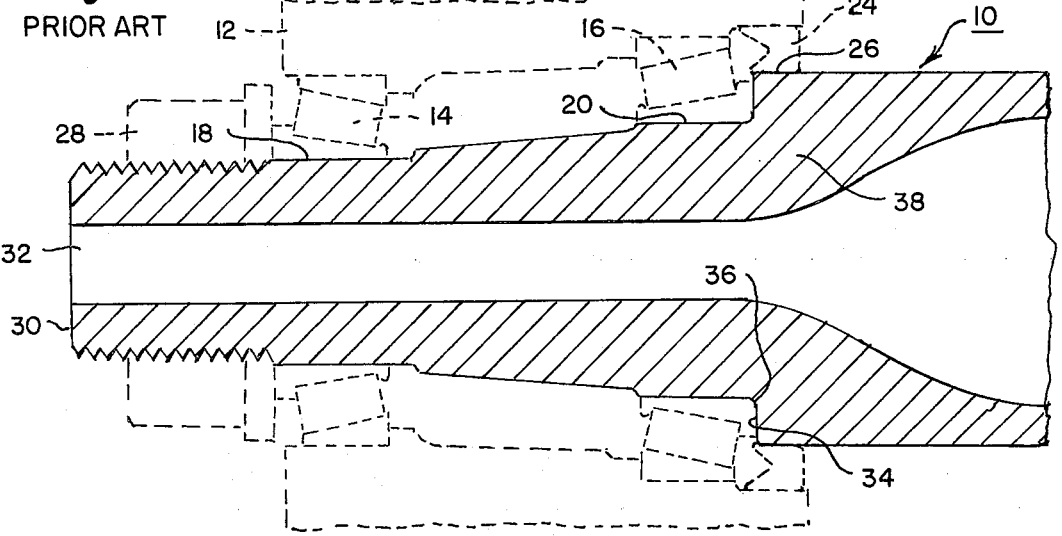
FIG. 1 is a sectional side view of a prior art spindle end of a tubular axle with the bearing assemblies shown in phantom.

As seen in FIG. 1, a prior art axle spindle is adapted to rotatably support a wheel (not shown) mounted on a wheel hub 12 at a pair of axially disposed wheel bearing assemblies 14 and 16. The outer bearing assembly 14 and the inner bearing assembly 16 are respectively received at an axially separated pair of cylindrical bearing regions 18 and 20 of the spindle 10. During installation, the bearing assemblies 14 and 16 are installed within the central opening of the wheel hub 12 and the hub 12 is axially positioned on the spindle 10 to locate the inner bearing assembly 16 against an integral, radially extending bearing stop 22 of the spindle 10. The inner bearing region 20 has a larger external diameter than the outer bearing region 18 to facilitate assembly. An oil seal 24 is provided at the interior side of the wheel hub 12 to make sliding contact with an exterior surface 26 of the spindle 10 to insure lubrication will be retained at the inner bearing assembly 16 during wheel operation.

A locking nut assembly 28 is installed on the threaded end 30 of the spindle 10 to apply axial force to the wheel hub 12 as the inner bearing 16 is forced against the bearing stop 22. A hub cap (not shown) and a suitable means for sealing the central opening 32 of the spindle 10 at end 30 are provided to protect the locking nut assembly 28 and to establish the wheel lubrication area at the exterior side of the wheel hub 12.

As mentioned hereinabove, there presently exists a number of methods for forming an axle spindle of the type generally shown in FIG. 1. Spindles for trailer or drive axles might be integrally formed or welded to a central beam or axle housing extending to the right of FIG. 1 (not shown). Although the general configuration of spindle 10 is typical of a number of spindles presently in use, the portion of the axle between the spindles might be shaped or designed differently depending on the function of the axle. For example, the beam of a trailer axle might have a circular or rectangular cross section without affecting the dimension of the spindle needed to support the wheel. Although the exterior surface 26 of the spindle at the bearing seal 24 must be cylindrical for proper sealing, the shape required for a proper transitional area to join with the center portion of the axle will not alter the spindle 10 as described above.

Similarly, spindles found on steering axles do not typically extend to the right of the oil seal 24 as shown in FIG. 1. Instead, the spindle is shortened to extend from a steering knuckle which is, in turn, pivotally joined to a steering axle beam. It is well known in the art that different wheel hub mounting means, bearing seals and the addition of various types of brake assemblies would, similarly, not alter the basic spindle configuration requiring two axially separated bearing regions having different diameters and a bearing stop adjacent the inner bearing region for proper receipt and retention of the wheel hub on the spindle.

It is a primary concern in all axle configurations of the type described that the spindle be provided adequate strength for supporting the wheel throughout operation of the heavy duty truck and/or trailer. It has been found that the spindle is subject to significant stress in the bearing stop region. Hot forging or otherwise forming the spindle 10 to provide an integrally formed shoulder 34 to provide the bearing stop 22 requires an abrupt transition in the outer configuration of the spindle at 36 causing a high concentration of stresses in this region. Compounding the problem is the fact that some forming methods alter the crystaline structure of the metal as it is being worked to provide this transition which would further decrease its ability to withstand stress when compared to the strength at other locations along the length of the axle. Consequently, the spindle 10 is typically provided an additional concentration of metal at 38 which increases the strength of the spindle in this region but significantly adds to its overall weight and to the amount of metal required for its formation. There is a continuing need to decrease the overall weight of heavy duty trucks and trailers to reduce fuel requirements and to minimize the raw material expenses which add to the overall manufacturing costs.

Figure 2:
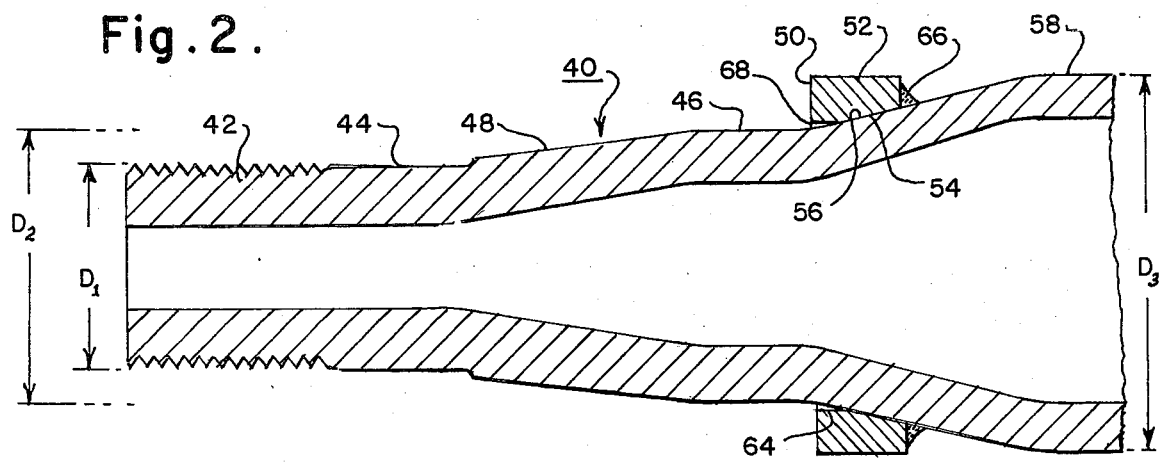
FIG. 2 is a sectional view of the final machined axle spindle of the present invention.

As seen in FIG. 2, the preferred axle spindle 40 provides an overall exterior configuration similar to the prior art spindle 10 of FIG. 1. The spindle 40 will support a wheel and wheel hub configuration identical to that depicted in FIG. 1. A first end 42 is threaded and includes an outer wheel bearing region 44 having a cylindrical outer surface with a diameter $D_1$ to receive the outer wheel bearing assembly thereon. The inner bearing region 46 has a cylindrical outer surface with a diameter $D_2$ which is larger than the diameter $D_1$. The inner bearing region 46 is axially separated from the region 40 with a generally frusto-conical transition region 48 therebetween.

A radially extending bearing stop surface 50 and an oil sealing surface 60 are again provided adjacent the inner bearing region 46. However, unlike the prior art devices, the bearing stop surface 50 and oil sealing surface 60 are located on a non-integral collar 52 which is welded or otherwise secured to spindle 40. The collar 52 includes a tapered frusto-conical inner surface 54 to be closely received on a frusto-conical outer surface of a transition region 56 between the inner bearing region 46 and the main spindle portion 58 located remote from the end 42.

Figure 6:
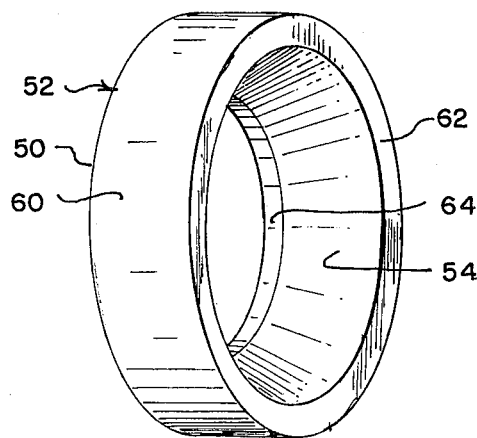
FIG. 6 is a perspective view of the collar prior to its being secured to the formed portion of the axle spindle.

As seen in FIG. 6, the collar 52, prior to installation on the major portion of the spindle 40, includes the outer cylindrical surface 60 and a narrow radially extending rear surface 62 remote from the bearing stop surface 50. The interior surface includes a narrow cylindrical portion 64 in addition to the frusto-conical surface 54 to provide a minimum internal diameter which is slightly larger than the diameter $D_2$ of the inner bearing region 46.

Returning to FIG. 2, it can be seen that collar 52 is preferably secured to the transition region 56 by arc welding at 66. The spindle 40 is rotated as the weld 66 is provided along the entire circumference of the rear surface 62. Welding in this region causes the forces acting on the collar 52 during axle use to be displaced from the region immediately adjacent the inner bearing region 46 to prevent the stress concentrations that existed in the prior art spindles. As an alternative to arc welding, friction welding or the use of a metal-to-metal bonding material could also be employed to secure the collar 52. In some axle configurations, it is possible that the region 56 and the inner surface 54 of the collar 52 could be provided a locking taper so that the collar 52 could be axially forced on the region 56 and locked in position thereon without any need for welding or bonding. In any case, the collar 52 is provided the interior cylindrical portion 64 to insure that a gap 68 (shown enlarged in FIG. 2) exists between the collar 52 and the region 56 adjacent the inner bearing region 46. It is desirable for all methods of securing the collar 52 to prevent rigid bonding or welding adjacent the inner bearing region 46 which might produce the undesired higher concentration of forces which exist at the integrally formed bearing stop of the prior art spindles.

Either before or after the collar 52 is added to the remaining portion of the spindle 40, the spindle 40 is finished by methods well known in the axle art. For example, the end 42 is threaded and the bearing regions 44, 46 and the bearing stop surface 50 are provided a final machining and induction hardening. However, the cross section of the finished spindle 40 of FIG. 2 can be seen to be quite different from those of the prior art designs discussed hereinabove. The use of a non-integral collar allows the remaining portion of the spindle 40 to be lighter while retaining the desired strength characteristics. The gradual reduction in diameter from the center to the end of the spindle without extreme transitions or discontinuities eliminates the need for additional metal within the spindle so that a relatively uniform thickness can be provided. While the tubular configuration might be provided through a number of forming methods, it is preferable to begin the formation from a tubular blank of steel or other suitable metal. Consequently, for trailer axles, for example, it would now be possible to provide a single tubular blank that can be initially shaped in the center to form the beam portion with any desired cross section. Additional formation of the ends of the blank would provide the spindle regions. Although hot swagging methods could be employed, the preferred method includes cold forming which would reduce the energy required to form the axle and thus further reduce the overall cost of manufacture.

Figure 3:
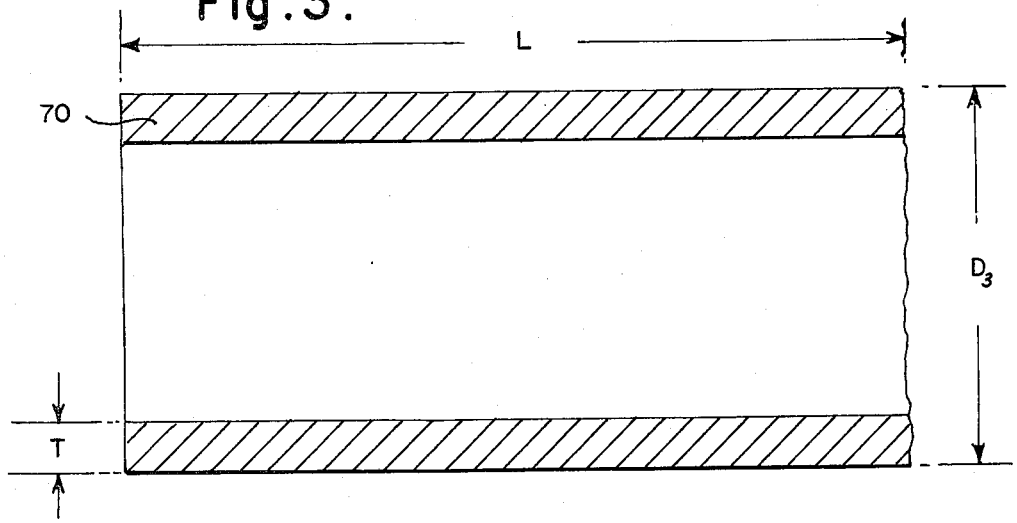
FIG. 3 is a sectional side view of the tubular blank used in the method for forming an axle spindle.

As seen in FIG. 3, a preferred tubular blank 70 is cylindrical in shape with the outside diameter $D_3$ and a uniform thickness T. The length L of the blank 70 would be less than the length of the finished axle as shown in FIG. 2 and can be predetermined by those skilled in the metal working art. The length would depend on the particular metal employed, the diameter and wall thickness of the blank and the exact configuration desired for the spindle region. It is also known that if the above mentioned parameters are identical, the length might still be different depending on whether hot swaging or cold forming is to be employed.

In a typical axle produced by the preferred method of cold forming, the tubular blank would have an outer diameter of 5 inches, a wall thickness of 0.5 inch and a length of approximately 76 inches. The finished axle including spindles 40 would have an overall length of about 81 inches with the outer bearing region and inner bearing region, respectively, having outer diameters of about 2.6 and 3.5 inches. The collar 52 would have a height of about 0.6 inch and an axial length of about 1 inch.

Figure 4:
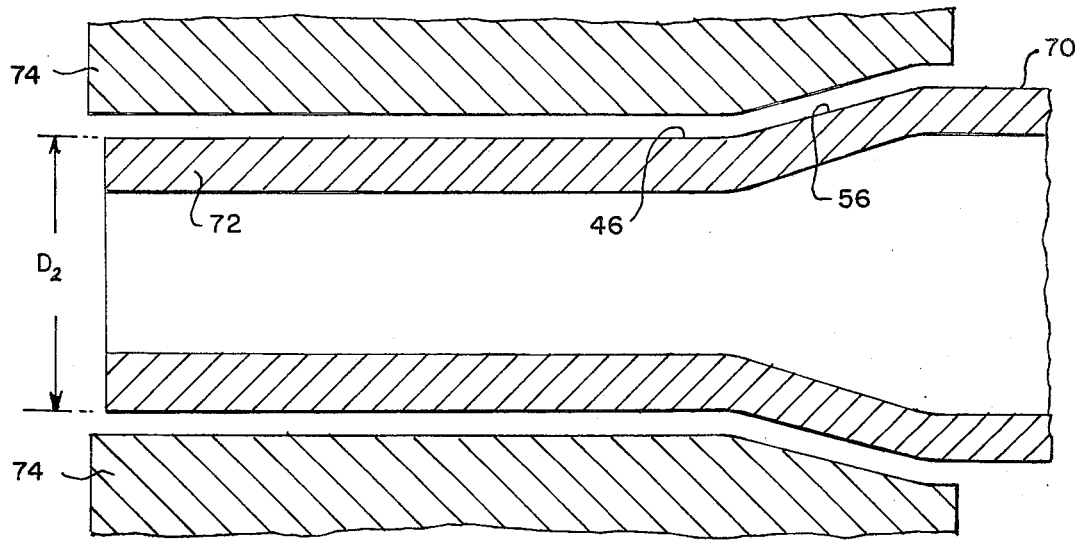
FIG. 4 is a sectional side view of the tubular blank after being reduced by the first forming tool.

As seen in FIG. 4, the first step of cold forming basically reduces the blank 70 to provide the transition region 48 and to increase the diameter of the remaining end 72 of the spindle region to the diameter $D_2$. Cold forming is preferably accomplished by the use of a plurality of radially, inwardly moving dies 74 (only two of which are shown). In one such cold forming machine, twelve dies are circumferentially disposed about the blank 70 with only an 0.8 inch gap therebetween when the dies 74 are all inwardly positioned to form the blank 70. Although the cold forming machine can basically provide the spindle with the shape shown in FIG. 4 with only one inward and outward cycle of the dies 74, it is not uncommon in this type of recucing operation to rotate the work product for a second cycle to provide uniform reduction of the metal including the metal remaining between the gaps during the first cycle. It will be noted that after the first step is completed, the spindle region is elongated from the original length L and the tubular thickness has slightly increased from the original thickness T.

Figure 5:
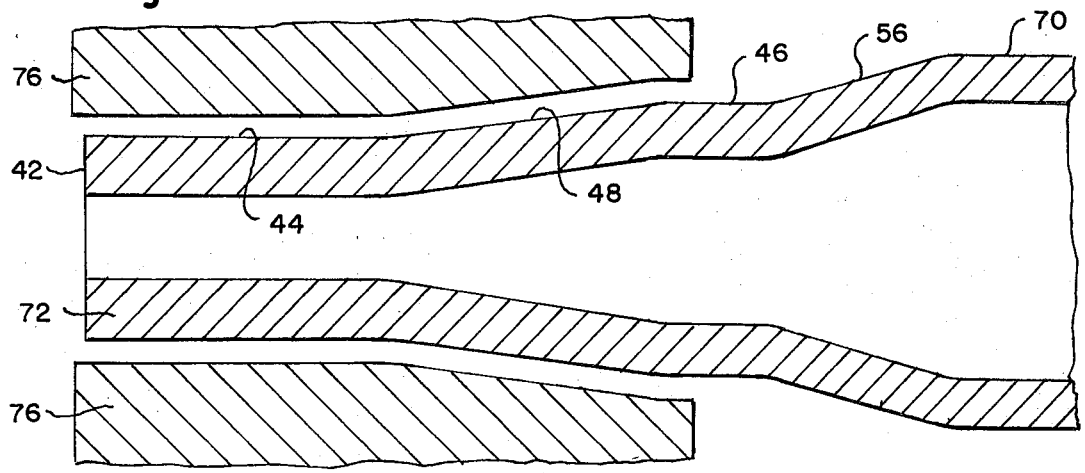
FIG. 5 is a sectional side view of the tubular blank after being reduced by the second forming tool.

As seen in FIG. 5, the second step of cold forming is similar to the firsrt step. A different set of twelve dies 76 further reduces the remaining end 72 to complete the definition of the inner bearing region 46 and to provide the transition region 48 and the end 42 of the spindle 40.

In circumferential cold forming of the type described, some practical limitations exist regarding the amount of reduction that can be accomplished in a single step. The gaps between the dies at the inward position can result in too great a space between the dies when they are all fully retracted if the required radial deformation is too great. Consequently, two steps are desired for the preferred spindle 40 but it is possible that some spindle configurations might allow a single cold forming step and that a non-integral collar could eliminate the extreme transition requirements and thus insure better strength and weight characteristics for the spindle.

Although the preferred axle spindle and method of forming the same has been described hereinabove, it can be seen that one skilled in the art could provide a different spindle or alter the method of formation without departing from the invention as claimed.

I claim:

1. A method of forming a spindle for an axle capable of supporting a vehicle wheel rotatably mounted thereon, said method comprising: providing a hollow tubular blank having a central axis, a generally uniform external diameter and wall thickness and a first open end; reducing said tubular blank at a first region thereof concentric with said central axis adjacent said first end to provide a first diameter therefor and a second region thereof concentric with said central axis remote from said first end to provide a second diameter which is greater than said first diameter and less than said external diameter; forming a first transition area between said first region and said second region and a second transition area having a generally frusto-conical outer surface between said second region and a portion of said tubular blank which is free of said reducing and remote from said first end; providing a collar having a minimum inner diameter greater than said second diameter for limited clearance therebetween and including a frusto-conical inner surface widening from said minimum inner diameter to match the taper of said second transition area, said collar having a radial surface at said minimum inner diameter which is generally perpendicular to an axis of said collar; mounting said collar on said second transition area; and securing said collar to said second transition area.

2. The method as set forth in claim 1, wherein the step of securing said collar is accomplished by electric arc welding.

3. The method as set forth in claim 2 wherrein said arc welding is confined to a location on said collar remote from said minimum inner diameter and remote from a portion of said second transition area adjacent said second region.

4. The method as set forth in claim 1, wherein the step of securing said collar is accomplished by friction welding.

5. The method as set forth in claim 1, wherein the step of securing said collar is accomplished by metal to metal bonding material being applied between said collar and said second transition area with axial force being applied to said collar until said material becomes fixed.

6. The method as set forth in claim 1, wherein said steps of reducing at said first and said second regions and forming said first and second transition areas are accomplished by circumferentially cold working said tubular blank.

7. The method as set forth in claim 6, wherein a first step of cold forming includes forming said second region and said second transition area and reducing the said blank at said first region and said first transition area to provide an interim diameter therefor which is equal to said second diameter and a second step of cold forming to complete the formation of said first region and said first transition area.

8. The method set forth in claim 1, further including machining said first region and said second region for receipt of bearing assemblies thereon for mounting said wheel on said spindle.

9. The method as set forth in claim 1, further including machining said radial surface of said collar for receipt of a bearing assembly for said second region against said collar.

10. A method of forming a spindle for an axle capable of supporting a vehicle wheel rotatably mounted thereon, said method comprising: providing a hollow tubular blank having a central axis, a generally uniform external diameter and wall thickness and a first open end; reducing said tubular blank at a first region thereof concentric with said central axis adjacent said first end to provide a first diameter therefor and a second region thereof concentric with said central axis remote from said first end to provide a second diameter therefor; said first diameter and said second diameter being less than said external diameter; forming a transition area having a generally frusto-conical outer surface between said second region and a portion of said tubular blank which is free of said reducing and remote from said first end; providing a collar having a minimum inner diameter greater than said second diameter for limited clearance therebetween and including a frusto-conical inner surface widening from said minimum inner diameter to match the taper of said transition area, said collar having a radial distance at said minimum inner diameter which is generally perpendicular to an axis of said collar; mounting said collar on said transition area; and securing said collar to said transition area.

11. The method as set forth in claim 10, wherein the step of securing said collar is accomplished by electric arc welding.

12. The method as set forth in claim 11, wherein said arc welding is confined to a location on said collar remote from said minimum inner diameter and remote from a portion of said transition area adjacent said second region.

13. The method as set forth in claim 10, wherein the step of securing said collar is accomplished by friction welding.

14. The method as set forth in claim 10, wherein the step of securing said collar is accomplished by metal to metal bonding material being applied between said collar and said second transition area with axial force being applied to said collar until said material becomes fixed.

15. The method as set forth in claim 10, wherein said steps of reducing at said first and said second regions and forming said transition area are accomplished by circumferentially cold working said tubular blank.

16. The method as set forth in claim 10, further including machining said first region and said second region for receipt of bearing assemblies thereon for mounting said wheel on said spindle.

17. The method as set forth in claim 10, further including machining said radial surface of said collar for receipt of a bearing assembly for said second region against said collar.

* * * * *

UNITED STATES PATENT AND TRADEMARK OFFICE
CERTIFICATE OF CORRECTION

PATENT NO. : 4,298,155
DATED : November 3, 1981
INVENTOR(S) : John Palovcik

It is certified that error appears in the above—identified patent and that said Letters Patent is hereby corrected as shown below:

| | |
|---|---|
| Column 1, Line 39 | After "there" delete 'has' and insert --have-- |
| Column 2, Line 61 | After "reducing" delete 'the' and insert --and-- |
| Column 6, Line 7 | After "to" delete 'increase' and insert --decrease-- |

Signed and Sealed this

Ninth Day of March 1982

[SEAL]

Attest:

GERALD J. MOSSINGHOFF

Attesting Officer     Commissioner of Patents and Trademarks